United States Patent [19]

Jansma

[11] Patent Number: 5,045,752
[45] Date of Patent: Sep. 3, 1991

[54] MINIMIZING MERCURY CONDENSATION IN TWO LAYER FLUORESCENT LAMPS

[75] Inventor: Jon B. Jansma, University Heights, Ohio

[73] Assignee: General Electric Company, Schenectady, N.Y.

[21] Appl. No.: 426,635

[22] Filed: Oct. 24, 1989

[51] Int. Cl.$^5$ .................. H01J 61/44; H01J 61/48
[52] U.S. Cl. .................... 313/487; 313/489
[58] Field of Search ................ 313/487, 489

[56] References Cited

U.S. PATENT DOCUMENTS

| 3,937,998 | 2/1976 | Verstegen et al. | 313/487 |
| 4,079,288 | 3/1978 | Maloney et al. | 313/489 |
| 4,088,923 | 5/1978 | Manders | 313/487 |
| 4,121,132 | 10/1978 | Repsher | 313/486 |
| 4,431,941 | 2/1984 | Roy et al. | 313/487 |
| 4,447,756 | 5/1984 | Kohmoto et al. | 313/487 |
| 4,547,700 | 10/1985 | Landry | 313/487 |
| 4,806,824 | 2/1989 | Paynter et al. | 313/486 |

FOREIGN PATENT DOCUMENTS 62-274545 11/1987 Japan .

Primary Examiner—Sandra L. O'Shea
Attorney, Agent, or Firm—Edward M. Corcoran; Stanley C. Corwin; Fred Jacob

[57] ABSTRACT

Mercury condensation in dual phosphor layer fluorescent lamps is inhibited by mixing alumina particles having a median particle size not less than about one-half micron with the phosphor particles in the first phosphor layer which is disposed adjacent the inner lamp envelope surface.

22 Claims, 1 Drawing Sheet

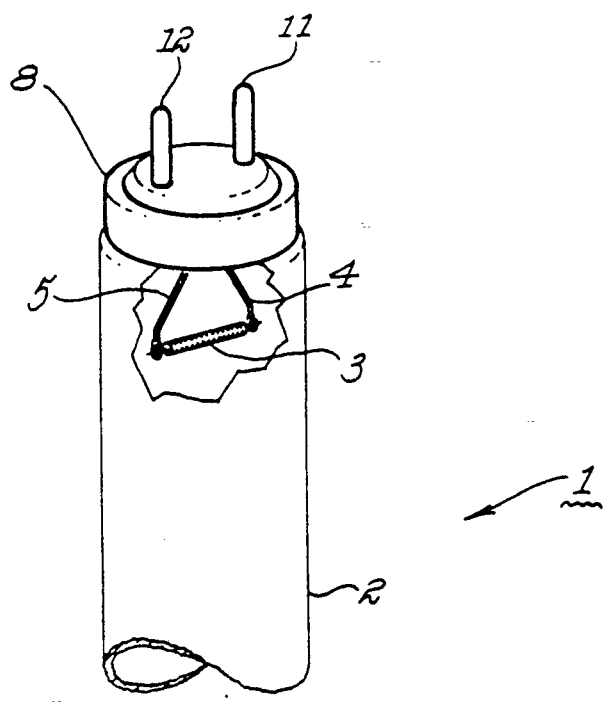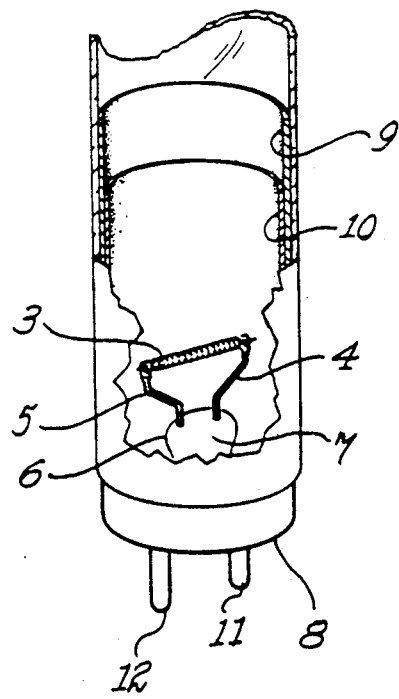

MINIMIZING MERCURY CONDENSATION IN TWO LAYER FLUORESCENT LAMPS

BACKGROUND OF THE INVENTION

1. Field of the Invention

This invention relates to minimizing mercury condensation in dual layer fluorescent lamps. More particularly, this invention relates to minimizing mercury condensation on the inside surface of the glass envelope of a fluorescent lamp which comprises a glass envelope enclosing electrodes and a discharge sustaining fill of mercury and an ionizable inert gas and having a first layer comprising a mixture of particles of a phosphor and alumina disposed on the inner surface of said envelope and a second layer of phosphor particles having an average particle size smaller than that of said phosphor in said first layer disposed on said first layer, wherein the average size of said alumina particles in said first layer is less than that of said phosphor in said first layer, but not less than about one-half micron, to inhibit said mercury from depositing onto said inner surface of said envelope.

2. Background of the Disclosure

Fluorescent lamps having two layers of phosphor with one layer superimposed or disposed on the other are well known and old to those skilled in the art. Two different layers are generally employed to improve phosphor maintenance and lumen output, to reduce overall phosphor cost, or both. In many of the high color rendering premium types of fluorescent lamps commercially available today, the first layer of phosphor will be a relatively inexpensive phosphor which emits a white light, such as a calcium halophosphate activated with antimony and manganese, with the second layer of phosphor which is superimposed over the first layer containing substantially more expensive high color rendering red, blue and green color-emitting phosphors. U.S. Pat. Nos. 4,088,923 and 4,806,824 disclose a fluorescent lamp having a dual layer phosphor coating wherein the base layer is a conventional calcium halophosphate phosphor on top of which is superimposed a layer of phosphor comprising a mixture of three different phosphors which produce red, blue and green color emission. U.S. Pat. No. 3,937,998 discloses an example of such a triphosphor layer comprising a mixture of blue, green and red color emitting phosphors. Yet other examples are disclosed in U.S. Pat. No. 4,431,941.

More recently it has been found that if the median particle size of the phosphor particles in the top or second coat is smaller than the median particle size of the phosphor particles in the base or first coat which is disposed adjacent the inner surface of the glass envelope, a problem occurs with regard to mercury passing through the two phosphor layers and condensing on the inside surface of the lamp glass envelope in the form of droplets and agglomerations or blotches of mercury. While this phenomenon has not resulted in any noticeable color change or lumen loss, it has resulted in customer dissatisfaction due to its appearance which some object to as unsightly. Consequently, there is a need to overcome this problem.

SUMMARY OF THE INVENTION

The present invention relates to a fluorescent lamp comprising a glass envelope enclosing electrodes and a discharge sustaining fill of mercury and an ionizable inert gas within and having a first layer comprising a mixture of particles of a phosphor and alumina disposed on the inner surface of said envelope and a second layer of phosphor particles disposed on said first layer, wherein said phosphor particles in said second layer have a median particle size smaller than that of said phosphor particles in said first layer and wherein the median size of said alumina particles in said first layer is less than that of said phosphor particles in said first phosphor, but not less than about one-half micron. This has been found to significantly inhibit the mercury from depositing and condensing onto the inner surface of the lamp envelope, without any adverse affect on lumen output or maintenance of the fluorescent lamp. In most applications, the phosphor composition in the first layer will generally be different from the phosphor composition in the second layer. The alumina will preferably be a high purity alumina (i.e., at least about 99.9 wt. % $Al_2O_3$) having a median particle size ranging from between about 0.5-6 microns, preferably from about 0.5-3 microns and still more preferably from about 1-2 microns. The amount of alumina will broadly range from about 5-40 wt. %, preferably from about 10-30 wt. % and more preferably from about 12-20 wt % of the combined total of alumina and phosphor in the first layer.

BRIEF DESCRIPTION OF THE DRAWING

The Figure illustrates in perspective view a partially broken away section of a low pressure mercury discharge fluorescent lamp utilizing a dual layer phosphor coating in accordance with the present invention.

DETAILED DESCRIPTION

Referring to the Figure, lamp 1 comprises an elongated sealed glass envelope 2 having electrodes 3 at each end. Envelope 2 contains the usual discharge sustaining filling of mercury, along with an inert, ionizable gas (not shown). Electrodes 3 are connected to inlead wires 4 and 5 which extend through a glass seal 6 in a mount stem 7 to the electrical contacts of base 8 fixed at both ends of the sealed glass envelope and containing contact pins 11 and 12 which are electrically connected to leads 4 and 5. The inert gas will generally be argon or a mixture of argon and krypton at a low pressure of about 1-4 torr. The inert gas acts as a buffer or means for limiting the arc current. Disposed on the inner wall of envelope 2 is a first or base layer 9 of particles of phosphor mixed with particles of alumina. A second phosphor layer 10 is disposed on layer 9. The median particle size of the phosphor particles in first layer 9 will generally range from about 7 to 15 microns and preferably from about 8 to 12 microns.

The alumina mixed with the phosphor particles in the first layer will have a median particle size broadly ranging from about 0.5-6 microns, preferably 0.5 to 3 microns and still more preferably from about 1 to 2 microns. As set forth above, this alumina will preferably be a high purity alumina having an $Al_2O_3$ content of at least about 99.9 wt. %. It is also preferred that the alumina be relatively free of alkali metals, iron and silicon (i.e., <20 ppm Na, <50 ppm K, <10 ppm Fe and <50 ppm Si). In a particularly preferred embodiment the alumina will have a purity of at least about 99.99 wt. % $Al_2O_3$.

By way of an illustrative, but non-limiting example, the phosphor particles in the first layer will comprise a calcium halophosphate phosphor, such as a type disclosed in U.S. Pat. Nos. 3,109,819 and 4,806,824 the disclosures of which are incorporated herein by reference. Similarly, the second phosphor layer 10 will comprise a triphosphor or mixture of three different red, green and blue color-emitting phosphors. An illustrative, but non-limiting example is a mixture of a red-emitting yttrium oxide activated by trivalent europium, a green-emitting cerium magnesium aluminate activated by trivalent terbium and a blue-emitting barium magnesium aluminate activated by divalent europium as is disclosed in U.S. Pat. No. 4,088,923. Alternatively a green color emitting terbium activated lanthanum cerium orthophosphate may be employed as disclosed in U.S. Pat. No. 4,423,349. A europium activated strontium chloroapatite phosphor can also be substituted for the europium-activated barium magnesium aluminate phosphor to serve as the blue color emitting phosphor component in the triphosphor blend, as is known to those skilled in the art.

The above examples are illustrative and are not meant to limit the invention to a triphosphor topcoat or to any of the particular phosphors in the example.

A number of fluorescent lamps of the type illustrated in the Figure were made having a 40T12 construction. That is, they were 40 watt lamps of a 4 foot length having an envelope diameter of twelve-eighths of an inch containing mercury and argon. All of these lamps were first coated on the inside of the lamp envelope with a base coat consisting of a mixture of a calcium halophosphate phosphor and from 0-20 wt. % of a high purity ceramic grade of alumina containing 99.99 wt. % alpha $Al_2O_3$ which was obtained from the Baikalox International Corporation in Charlotte, N.C. The topcoat was a triphosphor or mixture of three phosphors which were a yttrium-europium oxide (red-emitting), a lanthanum orthophosphate (green-emitting) and a europium-activated strontium chloroapatite (blue-emitting) in an amount of 55, 35 and 10 wt. % of the total, respectively. The median particle size in the triphosphor layer ranged from about 4-6 microns. The base coat or layer was a mixture of the high purity alumina and an antimony and manganese-activated calcium halophosphate of a type disclosed in U.S. Pat. Nos. 3,109,819 and 4,806,824. The base coat contained from 0-20 wt. % of the alumina based on the combined weight of phosphor and alumina. The median particle size of the calcium halophosphate phosphor was about 10-12 microns. Each lamp had from 5.5-6 grams of the calcium halophosphate in the first or base layer and 1.5-2 grams of triphosphor blend in the second layer.

The results are set forth in the table below. Each test group contained at least six lamps. The mercury laydown ratings were qualitative visual ratings. Good means that there was no visual appearance of mercury condensed on the inner surface of the lamp envelope. A poor rating means that there were large droplets or agglomerations of mercury (i.e., about 100 microns) spread out over about one-third the length of the lamp.

| Test Group | Wt. % $Al_2O_3$ in Base Coat | $Al_2O_3$ Particle Size, Microns | Lamp Lumens | | | Hg Laydown Rating |
|---|---|---|---|---|---|---|
| | | | 0 hr | 100 hr | 750 hr | |
| A | 0 | — | 3474 | 3413 | 3238 | Poor |
| B | 20 | 0.5 | 3594 | 3353 | 3163 | Good |
| | | | 0 hr | 100 hr | 500 hr | |
| C | 0 | — | 3627 | 3409 | 3312 | Poor |
| D | 10 | 1.5 | 3591 | 3332 | 3201 | Medium |
| E | 20 | 1.5 | 3516 | 3305 | 3194 | Good |
| F | 10 | 0.25 | 3607 | 3418 | 3257 | Good |
| G | 20 | 0.25 | 3596 | 3364 | 3229 | Good |
| H | 0 | — | | 3331 | | Poor |
| I | 10 | 1.5 | | 3337 | | Good |
| J | 5 | 1.5 | | 3352 | | Medium |

What is claimed is:

1. A fluorescent lamp comprising a glass envelope enclosing electrodes, a discharge sustaining fill of mercury, an ionizable inert gas and having two layers of phosphor, a first layer and a second layer, wherein the composition of the phosphor in said first layer is different from the composition of the phosphor in said second layer and wherein said first layer comprises a mixture of particles of phosphor and alumina and is disposed on the inner surface of said envelope and wherein said second layer is disposed on said first layer and contains phosphor particles having a median particle size smaller than the median size of said phosphor particles in said first layer and wherein the median size of said alumina particles is less than that of said phosphor particles in said first layer, but not less than about 0.25 micron, with said alumina particles being present in said first layer in an amount of from about 10-30 wt. % of said first layer to inhibit said mercury from depositing onto said inner surface of said envelope.

2. The lamp of claim 1 wherein said median particle size of said alumina in said first layer ranges from about 0.5-6 microns.

3. The lamp of claim 2 wherein said alumina is present in said first layer in an amount ranging from about 5-40 wt. % of the total amount of said alumina and phosphor in said first layer.

4. The lamp of claim 3 wherein said alumina is relatively free of alkali metals, iron and silicon.

5. The lamp of claim 4 wherein said alumina is at least about 99.9 wt. % $Al_2O_3$.

6. The lamp of claim 5 wherein said phosphor particles in said first layer have a median particle size of from about 7-15 microns.

7. The lamp of claim 6 wherein said alumina particle size ranges from about 0.5-3 microns.

8. The lamp of claim 7 wherein said alumina is at least about 99.99 wt. % $Al_2O_3$.

9. The lamp of claim 8 wherein said alumina particle size ranges from about 1-2 microns.

10. The lamp of claim 1 wherein said alumina is present in said first layer in an amount of from about 12-20 wt. %.

11. The lamp of claim 7 wherein said alumina is present in said first layer in an amount of from about 12-20 wt. %.

12. A fluorescent lamp comprising a sealed glass envelope enclosing within (i) a pair of electrodes, (ii) an ionizable inert gas, (iii) a discharge sustaining fill of mercury, (iv) a first layer of phosphor, comprising a mixture of particles of a calcium halophosphate phosphor and alumina disposed on the inner surface of said envelope and (v) a second layer of phosphor disposed on said first layer, said second layer of phosphor being different in composition than said first layer and comprising a triphosphor mixture having phosphors emitting in the red, blue and green colors, wherein said phosphor particles in said second layer have a median particle size smaller than that of said phosphor in said first layer and wherein the median size of said alumina particles in said first layer is less than that of said first phosphor but not less than about 0.25 micron, with said alumina particles being present in said first layer in an amount of from about 10–30 wt. % of said first layer to inhibit said mercury from depositing onto said inner surface of said envelope.

13. The lamp of claim 12 wherein said median particle size of said alumina in said first layer ranges from about 0.5 –6 microns.

14. The lamp of claim 13 wherein said alumina is present in said first layer in an amount ranging from about 5–40 wt. % of the total amount of said alumina and phosphor in said first layer.

15. The lamp of claim 14 wherein said alumina is relatively free of alkali metals, iron and silicon.

16. The lamp of claim 15 wherein said alumina is at least about 99.9 wt. % $Al_2O_3$.

17. The lamp of claim 16 wherein said phosphor particles in said first layer have a median particle size of from about 7–15 microns.

18. The lamp of claim 17 wherein said alumina particle size ranges from about 0.5–3 microns.

19. The lamp of claim 18 wherein said alumina is at least 99.99 wt. % $Al_2O_3$.

20. The lamp of claim 19 wherein said alumina particle size ranges from about 1–2 microns.

21. The lamp of claim 12 wherein said alumina is present in said first layer in an amount of from about 12-20 wt %.

22. The lamp of claim 19 wherein said alumina is present in said first layer in an amount of from about 12-20 wt. %.

* * * * *